Jan. 2, 1940.                D. I. HASKELL                2,185,994
SHOE MANUFACTURE
Filed Dec. 21, 1937
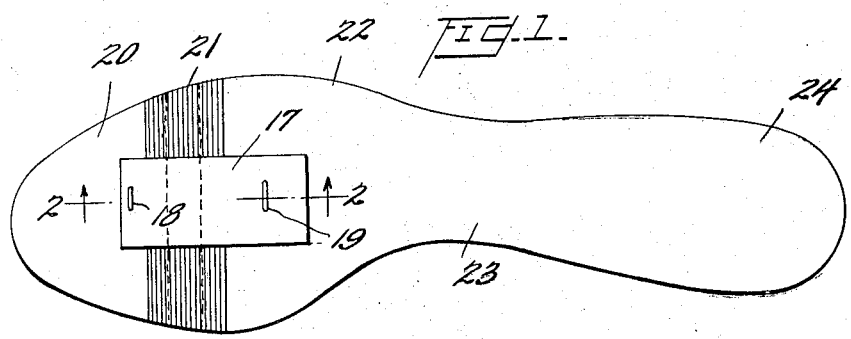
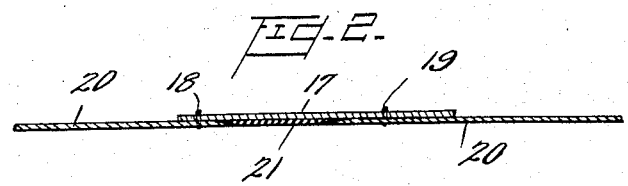
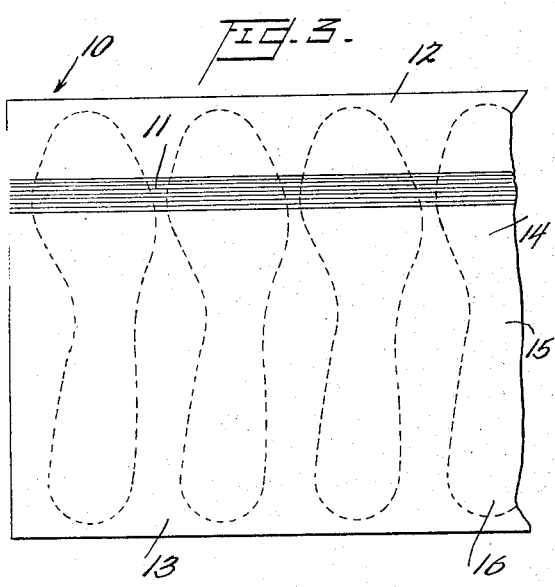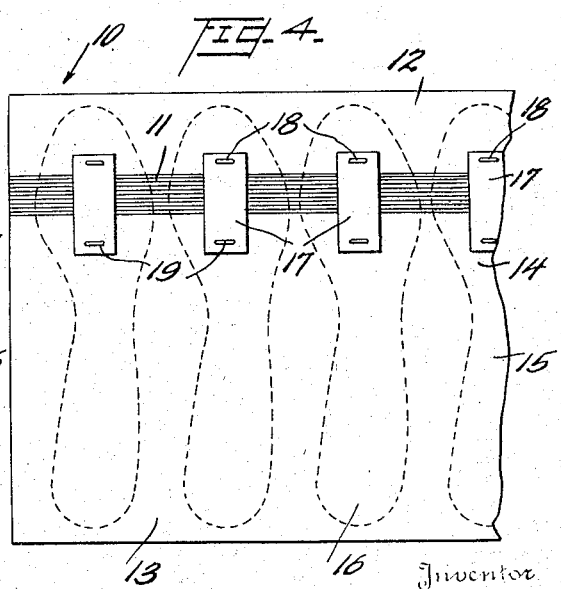
Inventor
David I. Haskell,
By J. Richard Paris,
Attorney Patented Jan. 2, 1940

2,185,994

UNITED STATES PATENT OFFICE 2,185,994

SHOE MANUFACTURE

David I. Haskell, Augusta, Maine

Application December 21, 1937, Serial No. 181,049

18 Claims. (Cl. 12—142)

The present invention relates generally to shoes and is more particularly directed to an innersole which is so designed and constructed that the shoe is rendered flexible, thereby substantially eliminating the discomfort occasioned during the period of breaking in new shoes by the wearer. The invention also relates to the method of manufacturing such insoles and to the method of manufacturing shoes embodying such insoles.

More particularly, the present invention relates to the same subject matter as that disclosed in my copending application Serial No. 175,717 and relates to the type of innersole disclosed and claimed in said application and to improved methods of manufacturing such innersoles and shoes embodying such innersoles.

The innersole to which the present application as well as the above mentioned copending application relates is so constructed and so built into the completed shoe that it assists in the flexing of the shoe. This is accomplished by embodying in the innersole a transverse portion of expansible and contractible material, the material being built into the shoe in its expanded state. In the preferred form of the invention this material comprises rubber strands or yarns which render it expansible and contractible or elastic in the desired direction. The same quality may also be obtained from other materials or by the suitable treatment of suitable materials such as by crinkling or corrugating suitable materials.

One of the objects of the present invention is to provide an innersole of the type described herein and in the above mentioned copending application, the innersole being so constructed that it has the same length as the last bottom and the lasting operation is, therefore, substantially simplified. For this purpose the innersole is stretched during its manufacture and is provided with one or more strips of relatively stiff material which bridge the elastic material and hold the same in stretched or expanded condition until the lasting of the innersole is completed at which time the operator removes these strips.

In the drawing:

Fig. 1 is a plan view of the innersole embodying the present invention;

Fig. 2 is a sectional view on line 2—2 of Fig. 1;

Fig. 3 is a plan view of a composite sheet employed in the manufacture of the present innersole; and Fig. 4 is a plan view of the same sheet in its stretched condition and bearing the stiffening strips.

The innersole of the present invention is shown in Figs. 1 and 2 in the condition in which it is delivered to the lasting machine. It comprises a toe portion 20 which may be made of any suitable material and in accordance with common practice it may, if desired, be made of rather stiff fibrous material. Immediately adjacent this portion 20 is a relatively narrow strip 21 of a material having the property of expanding and contracting and for this purpose in the preferred embodiment of the invention such material may comprise a rubber fabric or a fabric having rubber strands or yarns or it may be any other suitable material to which the quality of expansibility and contractibility is imparted by suitable treatment such as by crinkling or by corrugating the same. The remainder of the innersole comprises the ball portion 22, the shank 23, and the heel 24, and these may be made of any suitable material that is customarily employed in the manufacture of innersoles. I find that in innersoles embodying the present invention the material of which the ball portion 22 is manufactured may be of rather stiff materials as compared with materials which had been hitherto employed in the ball portions of innersoles and still the completed shoe embodying my invention has a degree of flexibility much higher than that obtained by the use of the older flexible materials. In the innersole shown in Figs. 1 and 2 the strip 21 is in its stretched and expanded condition and is held in this condition by the stiffening member 17 which is held attached to the portions 20 and 22 by staples 18 and 19 or other suitable attaching means which may be readily removed.

From what has been said earlier in the present specification, it will now be understood that the present innersole is applied to the last bottom in the customary way such as by tacks or the like, and this operation is followed by the customary operations in the manufacture of a shoe such as by the lasting of the upper and the like. At any suitable point in the manufacture of the shoe, the attaching devices 18 and 19 of the stiffening strip 17 are removed. The innersole is applied to the last bottom so that the stiffening strip 17 is exposed to view.

In the manufacture of the present innersole a composite sheet 10 is prepared which comprises an intermediate strip 11 of expansible and contractible material, such as rubber fabric, or a fabric having rubber strands, or any other suitable material which has the desired expansibility and contractibility such as a suitably crinkled or corrugated material. The band 12 is relatively narrow and is attached to one edge of the strip 11, whereas the band 13 is relatively wide and is attached to the other edge of the strip 11. The bands 12 and 13 may be made of any suitable material which has hitherto been commonly employed in the manufacture of innersoles. Thus, where it is desired to have a rather stiff toe portion, the band 12 may be made of rather rigid or stiff material. The band 13 includes the ball portion 14, the shank 15, and heel 16, and has at least for the ball portion 14 a suitable relatively flexible innersole material, whereas, the remaining portions 15 and 16 may be of the same material as the ball portion 14 or may be of other more rigid materials, as desired.

The adjacent edges of these strips or bands are preferably skived and united either by cementing or by stitching, or both.

The composite sheet is employed in die cutting a plurality of insoles, and this may be done by either of two methods.

In one method the sheet as shown in Fig. 3 is die cut by a suitable die which, however, is so shaped and designed that it is somewhat shorter in length than the length of the finished insole. After the insoles are thus cut, they are each stretched to the desired length and a strip 17 of relatively stiff material is attached to one face of the forepart of the insole by means of a pair of staples 18 and 19 as shown in Figs. 1 and 2. The insole thus obtained is now employed in the lasting of a shoe in the customary manner in that it is tacked to the bottom of the last and the manufacture of the shoe is then proceeded with in the customary way. The strip 17 together with the staples 18 and 19 are, however, removed from the insole at any convenient stage in the operations and after the insole has been tacked and lasted onto the last.

In another method of manufacture of the present insole, the entire composite sheet 10 is subjected to transverse stretching so that the expansible strip 11 therein is slightly stretched to the extent desired, and while this sheet is maintained in this stretched or tensioned condition a plurality of stiffening strips 17 are applied thereto by staples 18 and 19 as shown, or by any other temporary holding means, thus retaining the strip 11 in its transversely stretched condition. The stiffening strips 17 should be so spaced that when a plurality of insoles are die cut from the sheet, each insole should contain at least one such stiffener so that the stretched or expanded elastic material should be retained in its expanded condition.

Having thus described my invention, I claim:

1. An innersole having an expanded expansible contractible portion in a zone which is to be flexed in the act of walking, the expanded portion having stored energy for contracting the insole when unrestrained, and removable means holding said portion against contracting.

2. An innersole having an expanded portion in a zone which is to be flexed in the act of walking, the expanded portion having stored energy for contracting the insole when unrestrained, and a removable stiff strip attached to the innersole and bridging said expanded portion.

3. An innersole having an elastic portion transversely of its forepart, said portion being stretched lengthwise of the innersole, and removable means holding said portion against contraction.

4. An innersole having in its forepart an elastic portion stretched lengthwise of the innersole and a removable stiffening strip attached to the innersole and bridging said stretched portion.

5. An innersole having in the zone between the ball and toe portions a stretched band of elastic material and removable means holding said band against contraction.

6. The method of making shoes which comprises providing an innersole having in a zone, which is to be flexed in the act of walking, across the full width and thickness thereof, a stretched contractible portion, the portion having stored energy for contracting the insole, the insole also having removable means holding the same against contraction, tacking said innersole on a last bottom, and thereafter removing said means.

7. The method of making shoes which comprises providing an innersole having a stretched elastic portion in its forepart with a stiffening strip holding the same against contraction, tacking said innersole on a last bottom, and thereafter removing said strip.

8. The method of making shoes which comprises providing an innersole having in its forepart a stretched portion drawing adjacent parts to each other with means holding said parts against such movement, tacking said innersole on a last bottom and removing said holding means.

9. That improvement in methods of preparing an unattached insole for incorporation in a shoe which consists in providing the insole in a zone, which is to be flexed in the act of walking, with an expansible contractible portion capable when stretched of exerting a contractile force, stretching the said portion throughout the full width of the insole in a direction lengthwise of the insole, thus storing energy therein available when unrestrained to contract the insole and attaching to said insole readily removable means bridging said portion and restraining the insole against contraction.

10. The method of forming a plurality of insoles which comprises associating a strip of transversely resilient material with a pair of bands of innersole material attached one to each edge thereof, thereby forming a sheet having a width of at least the length of the insole and having a length of the combined width of a plurality of insoles, stretching said sheet widthwise and rendering it self contractible when unrestrained, attaching to said sheet a plurality of spaced substantially rigid tabs bridging the stretched strip, said tabs being spaced approximately the width of an insole, and cutting the insoles from said sheet transversely thereof.

11. The method of forming a plurality of insoles which comprises associating a strip of transversely resilient material with a pair of bands of innersole material attached one to each edge thereof, thereby forming a sheet having a width of at least the length of the insole and having a length of the combined width of a plurality of insoles, stretching said sheet widthwise and rendering it self contractible when unrestrained, attaching to said sheet a plurality of spaced substantially rigid tabs bridging the stretched strip, and cutting the insoles from said sheet transversely thereof.

12. The method of forming a plurality of insoles which comprises associating a strip of transversely resilient material with a pair of bands of suitable material attached one to each edge thereof, thereby forming a sheet having a width of at least the length of the insole and having a length of the combined width of a plurality of insoles, stretching said sheet widthwise and rendering itself contractible when unrestrained, attaching to said sheet means bridging the stretched strip and holding the same against contraction, and cutting the insoles from said sheet transversely thereof.

13. Blanks for forming a plurality of insoles consisting of an elongated sheet of a width at least the length of an insole having a toe zone, a ball zone, and a zone intermediate said toe and ball zones, the intermediate zone being of expansible contractible material, said material being in a transversely expanded condition, and tabs of substantially rigid material attached to said sheet and bridging said expanded zone for maintaining the same in its expanded condition.

14. The method of making innersoles comprising making an innersole with a strip of elastic material in its forepart, the length of said innersole being shorter than the length of the last, stretching said innersole to its desired length and attaching a relatively rigid tab to said innersole bridging the elastic portion to hold the same in its stretched condition.

15. Blanks for forming a plurality of insoles consisting of an elongated sheet of width at least the length of the insole, said sheet having a toe zone, a ball zone, and a relatively narrow intermediate zone of elastic material, said intermediate zone being stretched widthwise of the sheet and removable means carried by said sheet maintaining said intermediate zone in its stretched condition.

16. That improvement in the methods of preparing an unattached insole for incorporation in a shoe which consists in providing insole material in a zone, which is to be fixed in the act of walking, with an elastic portion capable when stretched of exerting a contractile force, stretching the said portion thus storing energy therein available when unrestrained to contract the insole material, and attaching thereto removable means restraining the elastic portion against contraction.

17. The method of making shoes comprising the steps of supplying an innersole having, in the zone between the tip and the widest part of the forepart, portions having relative longitudinal movement, another portion interposed between such relatively movable portions, said innersole carrying temporary means affixed to said forepart for preventing such relative movement, the free outer edges of such adjacent portions being in alignment, mounting said innersole on a last and attaching it in position, and removing the said temporary means.

18. An innersole having a substantially continuous marginal portion for attachment to the marginal portion of an upper, the forepart having portions capable of relative movement longitudinally of the innersole, another portion interposed between such relatively movable portions, the free outer edges of such adjacent portions being in alignment, and readily removable means attached to said forepart and bridging the space between said portions for preventing such relative movement of said portions during the making of a shoe incorporating the innersole.

DAVID I. HASKELL.